United States Patent Office 2,802,637
Patented Aug. 13, 1957

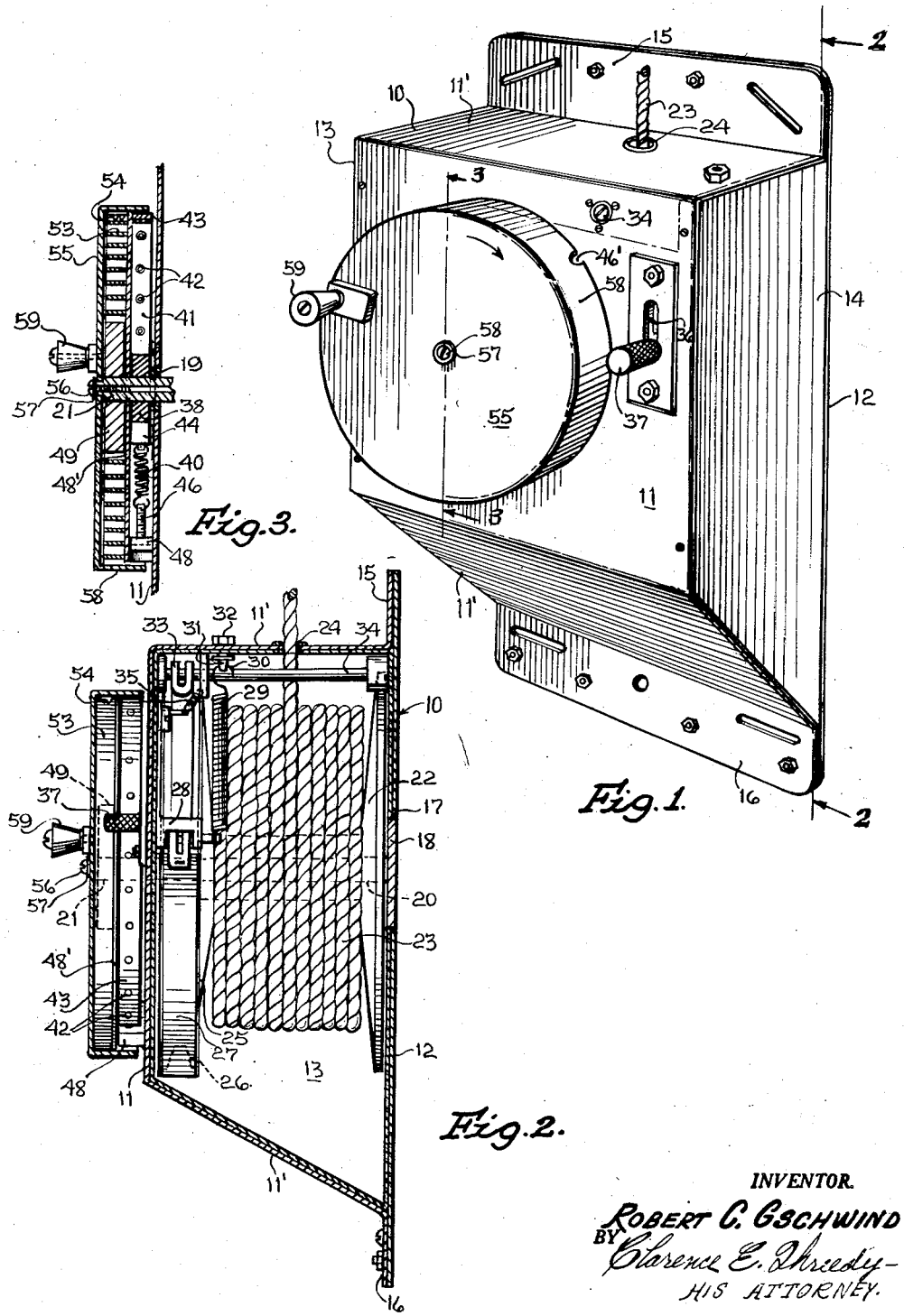

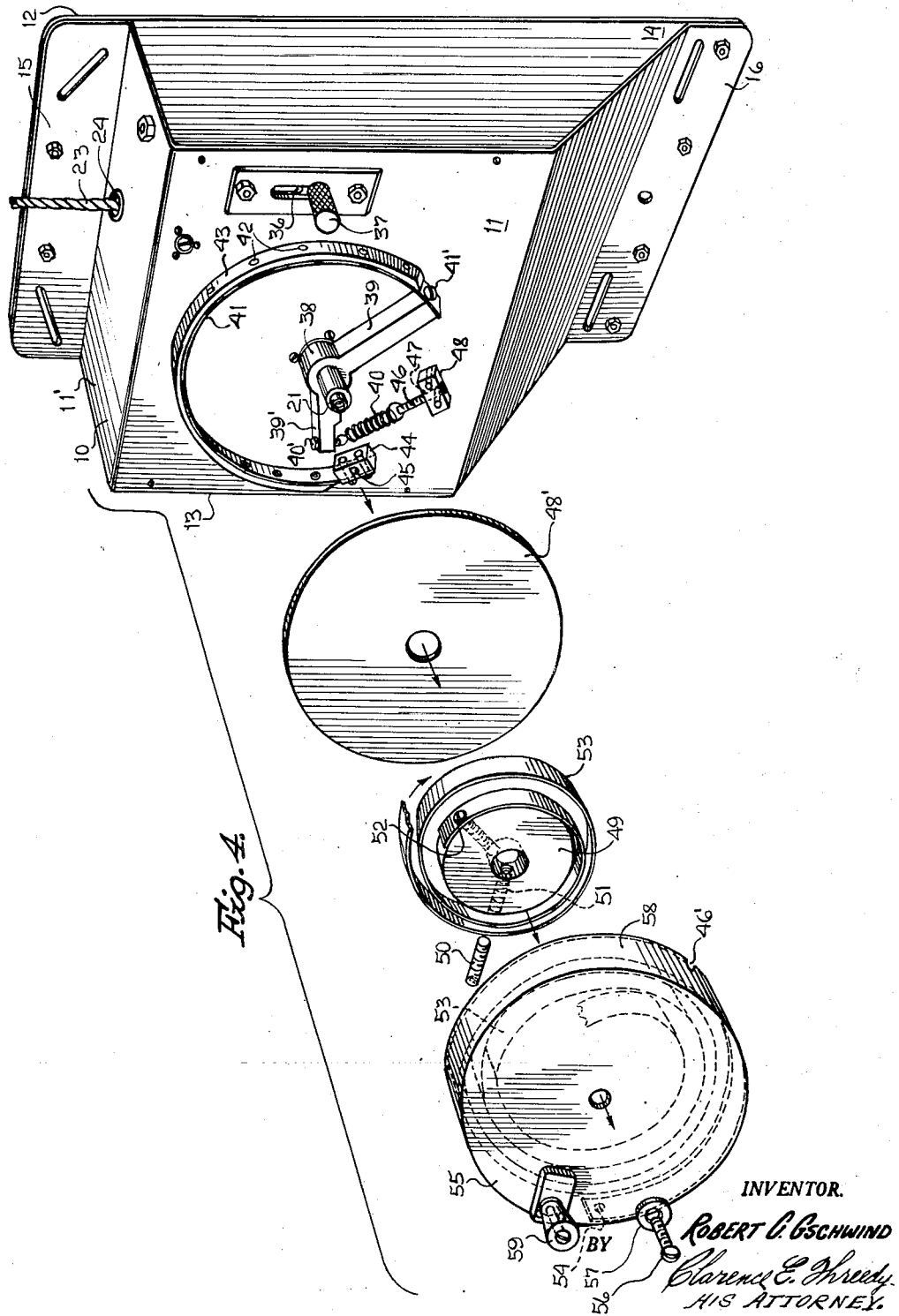

2,802,637
AUTOMATIC CABLE REWIND FOR A SAFETY DEVICE

Robert C. Gschwind, Chicago, Ill.

Application April 29, 1955, Serial No. 505,012

4 Claims. (Cl. 254—152)

This invention relates to an automatic cable rewind for a safety device and has for its principal object a construction of a device of this character which requires relatively few parts and one which may be economically manufactured and sold.

Another object of this invention is in the provision of an automatic rewind for a safety device which will not interfere with the operation of the braking means as contained in the safety device.

Still another object of this invention is the provision in a device of this character whereby the amount of cable to be rewound by the device may be adjusted.

Yet another and equally important object of this invention is the provision of a rewind device whereby the tension of a rewind mechanism may be adjusted without interference with the operation of the safety device.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of my safety device having my automatic rewind incorporated thereon;

Fig. 2 is a sectional detail view taken substantially on line 2—2 of Fig. 1;

Fig. 3 is a sectional detail view taken on line 3—3 of Fig. 1; and

Fig. 4 is a perspective view of my safety device showing the parts thereof in exploded relation.

This automatic rewind mechanism is associated with a safety device for preventing free falls into space such as is shown and described in my co-pending application Serial No. 419,881 now Pat. No. 2,729,425. Such safety device comprises a housing 10 having a front wall 11 and a back wall 12 with end walls 11' and side walls 13 and 14 respectively. The walls 11 and 12 provide longitudinally extending portions 15 and 16 to which may be attached a means for attaching the device to any stationary point.

The back wall 12 has formed therein a circular opening 17, in which is securely fitted a bearing 18. Journalled in this bearing 18 is a horizontal shaft 20 extending laterally from the wall 12. This shaft 20 passes through a like bearing 19 securely fitted in the front wall 11 and has its free end 21 projecting outwardly of the housing 10 as shown in Fig. 4. Mounted on this shaft 20 between the walls 11 and 12 and within the housing 10 is a pulley member 22. Coiled about this pulley member 22 within the housing 10 is a safety cable 23 having one end fixedly secured to the shaft 20 and its opposite free end passing out of the housing 10 through an aperture 24 formed in one of the end walls 11.

One wall 25 of the pulley member 22 has formed in its peripheral edge a substantially U-shaped channel 26 for the reception of a V-belt brake 27. This brake 27 is operative through a brake release member 28, which is actuated by centrifugally operated arms (not shown) carried by the wall 25 of the pulley member 22. The brake release member 28 will move into its braking position under tension of a spring 29. This spring has one end connected as at 30 to a threaded eye 31 bolted to one of the end walls 11' by a nut 32. The other end 33 of the brake 27 is fixedly connected to a stud 34 carried between the walls 11 and 12. The brake release member 28 is pivoted and held into its braking position by a spring 35. Fixedly attached to the brake member 28 and extending out a slot 36 formed in the wall 11 is a reset lever 37.

The operation of the above elements that make up the brake mechanism are fully shown and described in my co-pending application Serial No. 419,881 now Pat. No. 2,729,425, and make up no part of this present invention.

The brake is adapted to operate when the anti-clockwise rotation of such pulley member 22 obtains a predetermined speed. The V-belt brake 27 is then moved to frictionally engage in the U-shaped channel 26 so as to prevent further rotation of the pulley member 22 and the escape of the safety cable 23.

Journalled on the free end 21 of the shaft 20 is a bushing 38. This bushing is provided with two laterally extending arms 39 and 39'. The arm 39' has at its free end attached in any suitable manner such as by an eyelet screw 40' one end of a spring 40. The other arm 39 has at its free end attached in any suitable manner such as by a screw 41' one end of a brake disc 41. This brake disc 41 is formed of a flexible material such as steel and is adapted to partially encircle the free end 21 of the shaft 20 as shown in Fig. 4. Attached to the brake disc 41 by means of rivets 42 is a brake shoe 43. The opposite end of the brake disc 41 is fixed to a stationary block 44 secured to the wall 11, in any suitable manner such as by rivets 45.

This spring 40 has its opposite end connected to a bolt 46 threaded through a bore 47 of a stationary block 48 carried by the wall 11. The construction is such that under tension of the spring 40, the disc 41 together with the brake shoe 43 will be made to pivot about the free end 21 of the shaft 20. The further the adjusting bolt 46 is threaded into the block 48, the greater the tension of the spring 40. The tension of the spring 40 will cause the disc 41 of the brake shoe 43 to move further about the shaft 20.

Adapted to be placed over the free end 21 of the shaft 20 is a spacer disc 48'. Journalled on the shaft 20 on top of the spacer disc 48' is a washer disc 49. This washer disc 49 is secured to the shaft 20 through a set screw 50 adapted to pass through an aperture 51 formed in the washer 49. Under such an arrangement the washer 49 will rotate with the shaft 20. Attached to the peripheral edge of the washer 49 as at 52 is one end of a flat coil spring 53. The opposite end of the coil spring 53 is attached as at 54 to the inside peripheral edge of a cover 55 which is adapted to be journalled on the free end 21 of the shaft 20. The free end 21 of the shaft 20 has a threaded opening formed therein to receive a screw 56. When the cover is placed on the shaft 20, a washer 57 is placed on the free end 21 and the screw 56 is threaded therein. This forms a loose connection of the cover 55 to the shaft 20. The side peripheral wall 58 of the cover 55 is of such a depth as to extend toward the wall 11 so as to be embraced on the inside thereof by the brake shoe 43.

Under such a construction, as the cable 23 passes out of the housing 10 through the aperture 24, the pulley member 22, the shaft 20, and the washer 49 will all rotate in a counter-clockwise direction. The cover 55 by reason of the pressure thereon of the brake shoe 43 will be prevented from so rotating. Such continued rotation of the washer 49 in relation to the braking of the cover 55 will cause the tension of the spring 53 to increase.

This counter-clockwise rotation will tighten the coils of the spring 53 so that when the outward movement of the cable 23 stops and no longer is there pulling pressure thereon, the spring 53 will tend to rotate the disc 49, the shaft 20, and the pulley member 22 in a clock-wise direction to return to its original position.

Such rotation of the spring 53 will cause the shaft 20 to also rotate in a clock-wise direction so as to rewind the cable 23 on the pulley member 22. In the event that this device is worn by one who is required to work on the outside wall of a building, and who will by necessity be required to lower himself periodically, this device will permit such action without effecting the rewinding condition thereof. This is accomplished by the fact that after the spring 53 has tightened its coils to a predetermined degree, the pressure created on the cover 55 through the action of the spring 53 thereof will cause the cover 55 to slip and rotate in a like direction notwithstanding the braking effect as created by the brake shoe 43. The amount of pressure required to rotate the cover 55 may be regulated by the threading of the bolt 46 through the block 48. That is to say, if the brake shoe 43 is pivoted to bear against the cover 55, the cover 55 will be completely prevented from rotating under the pressure of the coiling of the spring 53. The bolt 46 may be adjusted through an opening 46' formed in the side wall 58 of the cover 55 as shown in Fig. 4.

In the event that after the user of the device has lowered himself to a predetermined distance and he wishes to permit more freedom of action of the cable within the housing 10, he may manually remove the braking tension between the cover 55 and the brake shoe 43 by rotating the cover 55 in an anti-clockwise direction. This movement will lessen the coiled tension of the spring 53. To facilitate such movement I have provided the cover 55 with a handle 59.

The function and operation of this rewind device will not affect in any measure the novel braking means for preventing rotation of the pulley member 22 within the housing 10 as set forth in my heretofore mentioned co-pending application.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. An automatic cable rewind for a safety device comprising a housing, a rotatable shaft carried by said housing and having one end projecting therefrom, a safety cable pulley member rotatably carried within said housing, a safety cable having one end connected to said member with its opposite free end passing out an opening formed in said housing, braking means carried by said pulley member and engageable therewith for preventing rotation of said pulley member in one direction when the rotation of said pulley member attains a predetermined speed, a rewind spring having one end connected to said one end of said shaft and coiled thereabout, a cover for said spring, the opposite end of said spring connected to said cover so as to operatively connect said cover to said one end of said shaft, the coils of said spring increasing in tension upon rotation of said shaft in said one direction, means within said cover and operative thereon for controlling rotation of said cover in said one direction, and means for regulating said controlling means, so as to rewind said cable only after a predetermined amount of tension is attained.

2. An automatic cable rewind for a safety device comprising a housing, a rotatable shaft carried by said housing and having one end projecting therefrom, a safety cable pulley member rotatably carried within said housing, a safety cable having one end connected to said member with its opposite free end passing out an opening formed in said housing, braking means carried by said pulley member and engageable therewith for preventing rotation of said pulley member in one direction when the rotation of said pulley member attains a predetermined speed, a rewind spring having one end connected to said one end of said shaft and coiled thereabout, a cover for said spring, the opposite end of said spring connected to said cover so as to operatively connect said cover to said one end of said shaft, the coils of said spring increasing in tension upon rotation of said shaft in said one direction so as to cause said cover to rotate in said one direction, a brake shoe carried exterior of said housing within said cover between said housing and said spring and adapted to operatively engage said cover for controlling rotation of said cover in said one direction, and adjustable means for positioning said brake shoe in its operative connection to said cover, so as to rewind said cable only after a predetermined amount of tension is attained.

3. An automatic cable rewind for a safety device comprising a housing for said cable, a rotatable shaft journalled in said housing carrying a cable pulley member, a cable rewind spring carried exterior of said housing, one end of said shaft projecting out of said housing and having means providing operative connection to said spring, a cover for said spring loosely carried by said one end of said shaft, so as not to be rotatable therewith, said spring coiled about said shaft under said cover and having operative connection to said cover, said coils of said spring increasing in tension by continuous rotation of said shaft in one direction, said cover rotatable in said one direction of said spring when said coils attain a predetermined tension, means within said cover between said housing and said spring and operative on said cover for controlling the rotation thereof, and spring means having operative connection to said controlling means for adjusting said controlling means, so as to rewind said cable only after a predetermined amount of tension is attained.

4. An automatic cable rewind for a safety device comprising a housing for said cable, a rotatable shaft journalled in said housing carrying a cable pulley member, a cable rewind spring carried exterior of said housing, one end of said shaft projecting out of said housing and having means providing operative connection to said spring, a circular cover for said spring loosely carried by said one end of said shaft, so as not to be rotatable therewith, said spring coiled about said shaft under said cover and having operative connection to said cover, said coils of said spring increasing in tension by continuous rotation of said shaft in one direction, said cover rotatable in said one direction of said spring when said coils attain a predetermined tension, braking means within said cover between said housing and said spring and operative on said cover for controlling rotation thereof under tension of said coiled spring, and means pivotally carried by said shaft and having connection with said braking means for adjusting said operative connection between said braking means and said cover, so as to rewind said cable only after a predetermined amount of tension is attained.

References Cited in the file of this patent
UNITED STATES PATENTS

| | | |
|---|---|---|
| 607,556 | Swyny et al. | July 19, 1898 |
| 2,546,202 | Trouin | Mar. 27, 1951 |
| 2,594,484 | Nixon | Apr. 29, 1952 |